SWITCHING ARRANGEMENT FOR AUTOMATIC TELEPHONE SYSTEMS

Filed May 19, 1955 4 Sheets-Sheet 1

INVENTORS
ERICH EHRICKE AND
FERDINAND JOHANNES DREYER,
ALSO KNOWN AS HANS DREYER, DECEASED,
By, Elisabeth Dreyer (Administratrix)
By. [signature] Atty.

SWITCHING ARRANGEMENT FOR AUTOMATIC TELEPHONE SYSTEMS

Filed May 19, 1955 4 Sheets-Sheet 2

INVENTORS
ERICH EHRICKE AND
FERDINAND JOHANNES DREYER,
ALSO KNOWN AS HANS DREYER, DECEASED,
By Elisabeth Dreyer,
(Administratrix)
By [signature] Atty.

SWITCHING ARRANGEMENT FOR AUTOMATIC TELEPHONE SYSTEMS

Filed May 19, 1955 4 Sheets-Sheet 3

INVENTORS
ERICH EHRICKE AND
FERDINAND JOHANNES DREYER,
ALSO KNOWN AS HANS DREYER, DECEASED,
By Elisabeth Dreyer (Administratrix)
By [signature] Atty.

SWITCHING ARRANGEMENT FOR AUTOMATIC TELEPHONE SYSTEMS

INVENTORS
ERICH EHRICKE AND
FERDINAND JOHANNES DREYER,
ALSO KNOWN AS HANS DREYER, DECEASED,
By Elisabeth Dreyer,
(Administratrix)

By [signature] Atty.

United States Patent Office 2,952,741
Patented Sept. 13, 1960

2,952,741

SWITCHING ARRANGEMENT FOR AUTOMATIC TELEPHONE SYSTEMS

Erich Ehricke, Munich, and Ferdinand Johannes Dreyer, also known as Hans Dreyer, deceased, late of Munich, Germany, by Elisabeth Dreyer, geb. Hemming, administratrix, Munich, Germany, assignors to Siemens & Halske Aktiengesellschaft Berlin and Munich, Munich, Germany, a corporation of Germany Filed May 19, 1955, Ser. No. 509,494
In Germany Feb. 1, 1950
Public Law 619, Aug. 23, 1954
Patent expires Feb. 1, 1970
8 Claims. (Cl. 179—18)

Figure 1:
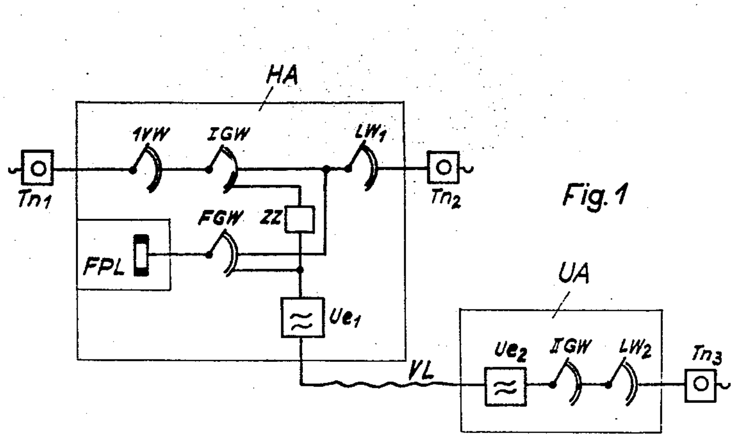

This invention is concerned with a switching arrangement for automatic telephone systems.

In telecommunication and particularly in automatic telephone systems, it is frequently necessary to transmit, from the connector back over the communication path which has been established, a signal indicating the conclusion of dialing. The dialing-conclusion signal may be differently utilized in the switching devices preceding the connector depending on the system.

Thus, for instance, in systems employing registers and translators, the register which operates on the subscriber's numbers is given a dialing-conclusion signal so as to cause disconnection thereof from the established connection. In other telephone systems, the dialing-conclusion signal may be transmitted to prevent further dialing by a calling subscriber in a telephone network connection to effect special switching operations over the same line in toll calls. This should be possible only for the toll operator. The toll operator, furthermore, after the setting of the connector to the desired line, has the possibility of dialing in order to connect with a busy line or to call back upon conclusion of a call. In such systems, the dialing-conclusion signal eliminates the necessity for a special toll signal in order to distinguish local calls from toll calls. A further possibility of the use of the dialing-conclusion signal resides in switching through a channel opened during the extension of a call. The dialing-conclusion signal may also be used to effect a switching operation only in the last incoming repeater, thus permitting transmission of other signals, for instance, check back or verification signals in long distance calls. A toll call will, in such cases, differ from an automatically dialed call by a special long distance signal, which effects switching in the incoming repeater by the dialing-conclusion signal only in the case of toll calls.

It has already been proposed to transmit a dialing-conclusion signal back from the connector in the form of pulses. This must take place upon termination of the setting of the connector because, during the dialing, at least one of the line conductors of the connecting path for the pulse transmission, and in most cases also the other line conductor for switching operations connected with the dialing, is occupied, for instance for the controlling of the selectors. Such an arrangement affords difficulties with regard to the proper moment of occurrence and the correct length of the dialing-conclusion pulses. These difficulties may be overcome only by increased expenditure and correspondingly high costs.

In order to avoid these difficulties, the present invention utilizes the fact that in existing telephone systems, in all stages provided for the building up of a connection (group selectors, repeaters, connectors, etc.) a given potential, for instance ground, or else no potential, is applied to one of the line conductors, making possible, for instance, the testing of the lines and connecting devices as to their operability.

In accordance with the present invention, the dialing-conclusion signal is produced temporarily or lastingly by changing and preferably disconnecting at the end of the selection operation the potential applied in all connecting devices of a connection for given switching operations to a line conductor, for instance, ground potential applied in the connector, such change being effected by switching means responsive to receipt of the receiving of dial pulses; switching means being provided in a preceding connecting device for testing, step by step, the connecting devices lying in the connecting paths with respect to this potential, and utilizing solely the change of potential in the connector. The disconnecting of the ground potential in the connector takes place suitably before the last series of dial pulses is received.

This solution has the particular advantage that the required switching means can be more easily installed in existing telephone systems than, for instance, arrangements for dialing-conclusion pulses which have to be measured. Since the dialing-conclusion signal is given by the connector at a very early stage, namely, even before the completion of the dialing, mutilations of the signal by further dialing on the part of the calling subscriber cannot take place. Finally, the arrangement in accordance with the invention is considerably less expensive because the switching operations for the required signal criterion must be taken care of not in a large number of connectors present, but rather in the line repeaters which are present only in considerably smaller number.

Figure 2:
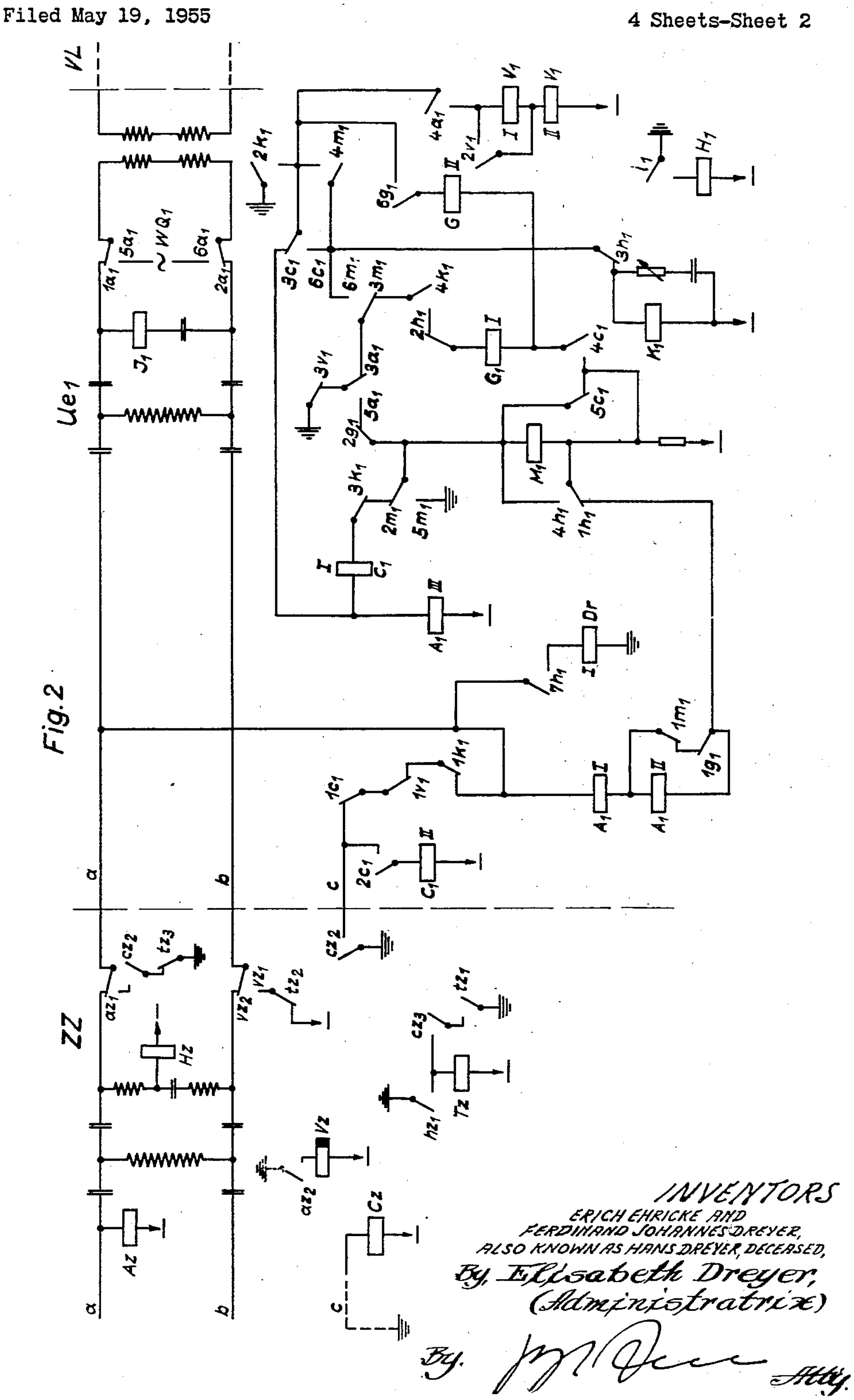
Figure 3:
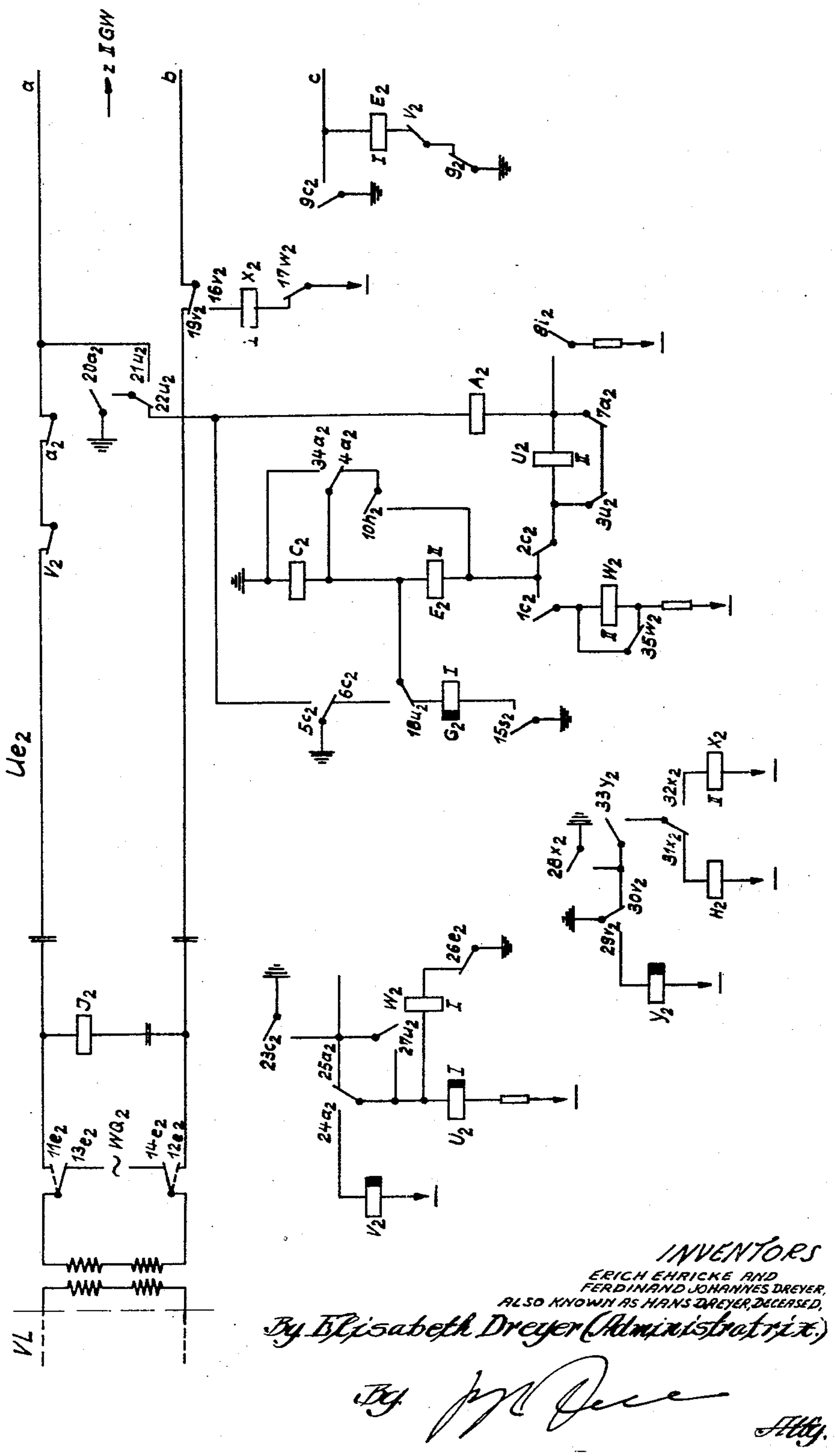
Figure 4:
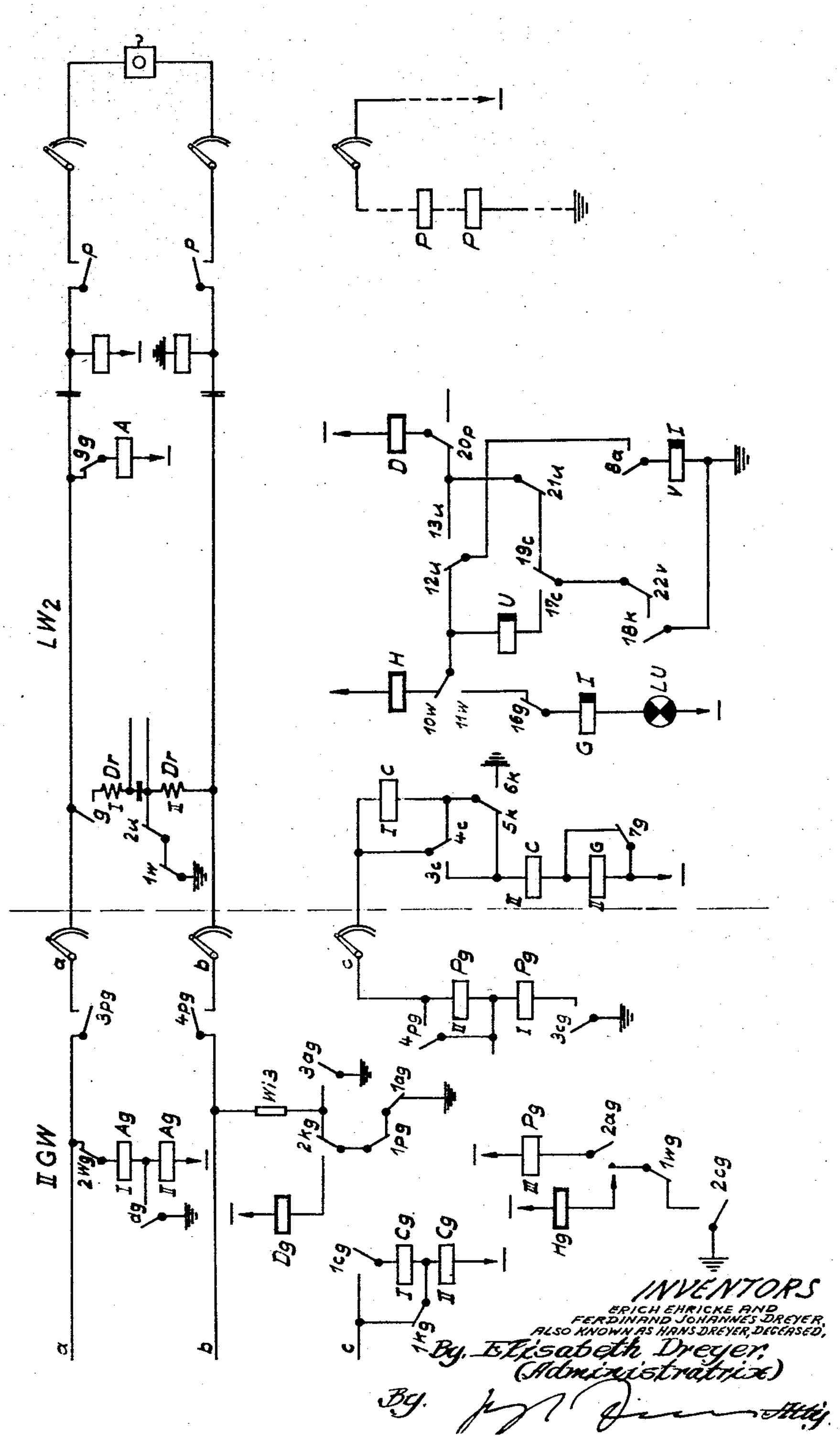

An embodiment of the invention will now be described with reference to the accompanying drawings in which Fig. 1 shows an overall circuit diagram to aid in describing respectively a directly dialed call and a toll call; and Figs. 2 to 4 show details of connecting devices necessary for an understanding of the invention.

In the main exchange HA, a local call may be established for instance between subscribers T*n*1 and T*n*2 over a first preselector 1VW, a first group selector such as IGW and a connector such as LW1. The subexchange UA may be reached, in the case of directly dialed calls, by the subscriber of the main exchange HA over the trunk lines VL only one of which is shown in order to keep the drawing simple. Trunk line VL, which may be adapted for alternating current operation, is reached by dialing a code number over a first group selector such as IGW of the main exchange HA. Associated with each trunk line is an outgoing A.C. repeater U*e*1 and a so-called time-zone unit ZZ which is set by the code signal transmitted by the calling subscribers. At the other end of the trunk line in the subexchange UA, there is disposed an incoming A.C. repeater U*e*2, which is connected to a second group selector IIGW. Over this group selector is reached the connector LW2 which has access to the subscriber T*n*3.

To the first group selector IGW of the main exchange HA, there is multiply connected a toll group selector FGW which is accessible to the toll operator position FPL. The toll operator position FPL has access over this toll group selector FGW both to connectors such as LW1 of the main exchange HA and to trunk lines such as VL. For making toll calls, the toll operator must have the possibility to transmit in customary manner special switching signals, for instance, signals for establishing connection to a busy subscriber's line or for recalling a desired line.

This problem is solved by the dialing-conclusion signal. For instance, when a call is made, in the case of a zoning system, a dialing-conclusion signal is transmitted back from the connector LW2, to make further transmission of dial pulses by the calling subscriber in the time-zone unit ZZ ineffective. Since the time-zone unit has no influence on the pulse transmission proceeding from the toll operator position FPL, the toll operator can transmit current pulses after the setting of the connector LW2 so as to build up the connecting or ringing current circuits in the connector.

Figs. 2, 3 and 4 show switching details of the successive connecting devices which are occupied during a directly dialed connection call on the part of a subscriber of the main exchange, namely, the time-zone unit ZZ, outgoing A.C. repeater U*e*1, incoming A.C. repeater U*e*2, second group selector IIGW and connector LW2.

In the following description, the plus symbol indicates the positive pole, which as a rule is grounded, while the minus symbol indicates the negative pole of the exchange battery. In order to make a directly dialed call, a calling subscriber of the main exchange HA (Fig. 1) has, let us assume, seized the time-zone unit ZZ (Fig. 2) over a preselector 1VW and the first group selector 1GW. Over the private or *c*-conductor of the first group selector, the seizure relay CZ energizes which closes its contact CZ2 to the private or *c*-conductor of the outgoing repeater U*e*1 to effect seizure thereof. In the repeater U*e*1 (Fig. 2), relay A1, winding I, energizes over the *c*-conductor. Relay A1 connects seizure relay C1 in series with the winding III of relay A1 in the following circuit: +, **3*v*1, 5*a*1, 2*g*1, 2*m*1, 3*k*1, C1I, A1III to. When relay A1 energizes, an A.C. pulse is transmitted to the trunk line VL from a source WQ1 over contacts 5*a*1, 6*a*1 of relay A1. The A.C. pulse is terminated by relay A1 connecting relay M1: +, 3*v*1, 5*a*1, 2*g*1, M1, —. Relay M1 interrupts the circuit for winding III of relay A1 and for the winding I of the holding relay C1 at the contact 2*m*1. Relay C1 is however held over its winding II, contact 2*c*1** and the incoming *c*-conductor. Relay A1 releases and, as already mentioned, terminates transmission of the A.C. seizure pulse. After relay A1 releases, relay M1 being energized, relay K1 is energized: +, **3*v*1, 3*a*1, 6*m*1, 3*h*1, K1, —. Relay K1 establishes a holding circuit for itself over contacts 2*k*1, 4*m*1 and prepares an energizing circuit for relay G1 at contact 4*k*1. Relay M1 is held over contact 5*m*1**.

In the incoming repeater U*e*2 (Fig. 3) relay E2, winding I, is energized over the *c*-conductor leading to the second group selector IIGW and contacts **11*e*2 and 12*e*2 are accordingly closed. The winding I of relay E2 has a high resistance so that the seizure relay of the second group selector cannot energize in this circuit. The current pulse receiving relay J2 is briefly energized by the incoming seizure pulse. Relay J2 connects the seizure relay C2: +, C2, E2II, 2*c*2, 3*u*2, 7*a*2, 8*j*2**, —. In this circuit, winding II of relay E2 is traversed by current so as to keep it energized even after the direct grounding of the outgoing *c*-conductor by contact **9*c*2 and consequent short-circuiting of its winding I. Relay C2 is after the release of relay J2 held energized over contact 1*c*2. Relay C2 connects relay A2 over contacts 5*c*2. Relay A2 short circuits relay C2 at contact 34*a*2. However, it is only briefly energized by the seizure pulse so that relay C2 does not release. After the release of relay A2, relay U2, winding I is connected over contacts 23*c*2 and 25*a*2. Relay U2 is thereupon held energized, over its contact 27*u*2, independently of contact 25*a*2** of relay A2.

In the second group selector IIGW (Fig. 4), seizure relay C*g* is energized from direct ground on the *c*-conductor incoming from the repeater U*e*2 (Fig. 3). Relay C*g* prepares a setting and test circuit for the second group selector. It may be mentioned at this point that in the normal position of the second group selector, ground is applied to its *b*-conductor from +, **1*ag*, 1*pg*, off-normal contact 2*kg***, resistor W*i*3. The same is true in a third group selector stage (not shown), the circuit of which corresponds to that of the second group selector.

Upon dialing by the calling subscriber, relay A*z* in the time-zone unit ZZ (Fig. 2) is energized intermittently in known manner. Relay A*z* applies ground intermittently over contact ***az*1** to the *a*-conductor (line conductor); at the same time, the slow-to-release relay V*z*, energized over contact ***az*2**, applies control voltage to the *b*-conductor (line conductor) at its contact ***vz*1**. The ground pulses energize relay A1 in repeater U*e*1 from +, ***tz*3, *cz*2, *az*1**, *a*-conductor, A1I, A1II, **1*h*1**, —. The control voltage on the *b*-conductor does not have any effect because only a second winding (not shown) of the choke coil D*r* is connected with the *b*-conductor in the repeater U*e*1. Relay A1 transmits the received current pulses as A.C. pulses to the trunk line VL by closing the contacts **5*a*1, 6*a*1. Relay V1 is connected by relay A1 in a circuit extending from +, 2*k*1, 4*a*1, V1I, V1II, —. Relay V1 is held energized during the train of pulses due to the short circuiting of winding II over contact 2*v*1**.

In the incoming repeater U*e*2, the incoming A.C. current pulses are received by relay J2. Relay J2 connects relay A2 in a circuit extending from +, **5*c*2, A2, 8*j*2**, —. Relay A2 now transmits the current pulses as ground pulses to the *a*-conductor for the second group selector IIGW (Fig. 4) from +, **20*a*2, 21*u*2**, *a*-conductor, off-normal contact **2*wg***, A*g*, —. After energization of relay A2, the slow-to-release relay V2 (Fig. 3) is energized in a circuit extending from +, **23*c*2, 27*u*2, 24*a*2, V2, —. Relay V2 is maintained energized during the series of current pulses. Relay V2, over its contact 16*v*2** applies control voltage to the *b*-conductor in a circuit including relay X2. Relay V2 furthermore connects the slow-to-release relay Y2 over contact **29*v*2**; relay Y2 remains energized during a series of current pulses. Relay X2 energizes in a circuit over the *b*-conductor in the second group selector (Fig. 4) to ground, the circuit extending from —, **17*w*2, X2I, 16V2**, *b*-conductor, resistor W*i*3, **2*kg*, 1*pg*, 1*ag*, +; it is maintained energized over the winding II during the series of current pulses in a circuit from +, 28*x*2, 33*y*2, 32*x*2, X2II, —. The energizing of relay H2 is prevented by the opening of contact 31*x*2**. After the completion of the train or series of pulses, relays V2, Y2, X2 deenergize, one after the other.

In the second group selector (Fig. 4) the current pulses coming from repeater U*e*2 over the *a*-conductor are received by the relay A*g* in a circuit from +, **20*a*2, 21*u*2**, *a*-conductor, off-normal contact **2*wg***, A*g*I, A*g*II, —. Relay A*g* by means of contact **2*ag*** connects the vertical magnet H*g* and, parallel to it, the winding III of the test relay P*g*, which acts as a switch-over relay due to short circuit of its winding II over contact **4*pg***. The selector lifts its wipers in known manner responsive to the train of current pulses. Thereupon it rotates the wipers under control of the relay A*g*, in hunting motion, to find an idle trunk line to a connector LW2. During the setting of the second group selector, ground is applied intermittently for reasons of symmetry to the *b*-conductor (by contact **3*ag***) but this is without effect on the relay X2 connected to the *b*-conductor in the repeater U*e*2, since relay X2, as already described, is held locally. After the second group selector has found an idle trunk line, the test relay P*g* is energized over the *c*-conductor (private conductor) to the connector LW2 in a circuit from +, **3*cg***, P*g*I, P*g*II, *c*-wiper, **4*c*, off-normal contact 5*k*, CII, 7*g***, —. Relay P*g* stops the hunting of the group selector by opening contact **1*pg***, busies the seized trunk by shunting its winding II and connects the two line conductors *a* and *b* through at contacts **3*pg*, 4*pg***.

In the connector LW2 (Fig. 4), the seizure relay C is energized over the *c*-conductor coming from the second group selector IIGW.

The last two trains of current pulses are transmitted directly from the repeater U*e*2 (Fig.3) to the connector LW2 (Fig. 4). In the repeater U*e*2, relay A2 again is energized intermittently and imparts grounding pulses to the *a*-conductor by means of contact **20*a*2**. At the same time, relay X2 is again connected by relay V2 to the *b*-conductor; it again tests whether there is ground potential or not. Since in the connector—as in the group selector stages preceding it—ground potential is on the *b*-conductor in the normal condition, relay X2 in the repeater U*e*2 is again energized in a circuit from —, 17W2, X2I, 16*v*2, *b*-conductor, 4*pg*, wiper *b*, DrII, 2*u*, off-normal contact 1*w*, +. Relay X2 remains energized until the termination of the next to the last train of dial pulses in a circuit from +, 28*x*2, 33*y*2, 32*x*2, X2II, —.

The ground pulses on the *a*-conductor coming from the repeater U*e*2 energize in the connector relay A in a circuit from +, 20*a*2, 21*u*2, *a*-conductor, 3*pg*, *a*-wiper, 9*g*, A, —. Relay A transmits the pulses over contact 8*a* to the vertical magnet H of the connector in a circuit including slow-to-release relay V. When the train of pulses terminates and the wipers of the connector have been raised to the corresponding decade, the slow-to-release relay V deenergizes. The slow-to-release relay U now energizes in series with the vertical magnet H from +, off-normal contact 18*k*, 22*v*, 17*c*, U, off-normal contact 10*w*, H, —. The vertical magnet does not operate in this circuit. Relay U, by means of contact 13*u* shifts the pulse circuit to the rotary magnet D so that upon receipt of the last series of pulses, these pulses are transmitted to the rotary magnet D. Relay U opens contact 2*u* and thus removes ground from the *b*-conductor leading to the repeater U*e*2.

Upon receipt of the last series of pulses at the incoming repeater U*e*2, the relay A2 again intermittently applies ground to the *a*-conductor. The slow-to-release relays V2 and Y2 are again connected, and relay X2 is connected to the *b*-conductor. Relay X2 can however no longer be energized since it does not find ground in the connector. This is the dialing conclusion which is prepared in the connector LW2 after the reception of the next to the last series of pulses (lifting) of connector wipers by disconnecting ground potential from the *b*-conductor at contact 2*u* and such signal is received in the preceding connecting device upon the beginning of the last series of pulses.

In the connector LW2, the pulse receiving relay A is again energized by the last series of pulses, such relay now actuating the rotary magnet D in a circuit from +, VI, 8*a*, 13*u*, 20*p*, D, —. Upon the first rotary step, the off-normal contact 1*w* is opened, which finally removes ground from the *b*-conductor. In series with the rotary magnet D, the slow-to-release relay V is energized. Relay U, after energization of relay V, is held energized over a second winding (not shown). When the pulses terminates, the relay G, after the release of relay V, energizes in series with relay U over the slow-speed interrupter LU from +, 18*k*, 22*v*, 17*c*, U, 11*w*, 16*g*, GI, LU, —. Relay G opens its energizing circuit at contact 16*g*, but is held energized over its winding II in series with the seizure relay C. Relay U restores with a certain delay. Relays G and U then prepare the test circuit for relay P.

The final disconnecting of the ground potential from the *b*-conductor in the connector could, instead of being effected by the off-normal contact 1*w*, also take place as a function of the answering of the call by the desired subscriber, so that after the release of relay U, ground would again be at the *b*-conductor which, however, would have no effect on the relay X2 of the repeater U*e*2.

In the repeater U*e*2 (Fig. 3), upon termination of the last series of pulses, relay V2 releases. Relay V2 opens the circuit of relay Y2 at contact 29*v*2. During the release interval of relay Y2, relay H2 is energized in a circuit from +, 30*v*2, 33*y*2, 31*x*2, H2, —. Relay H2, over contact 10*h*2 short circuits relay E2, winding II; relay E2 restores and transmits an A.C. pulse over contacts 13*e*2, 14*e*2 from the A.C. source WQ2 back to repeater U*e*1 (Fig. 2). The A.C. pulse is terminated in the repeater U*e*2 by the release of relay H2. After the release of relay H2, relay E2 actuates in series with the holding relay C2. During the release of relay E2, a circuit is closed for relay W2 from +, 26*e*2, W2I, U2I, —. After the actuation of relay E2, relay W2 is held energized in series with relays C2 and E2 over a second winding, the short circuit of which is opened at contact 35*w*2, the circuit extending from +, C2, E2II, 1*c*2, W2II, —. Contact 17*w*2 upon opening disconnects relay X2, winding I, finally from the *b*-conductor so that in case of any subsequent dialing by the telephone operator, further testing operation of relay X2 on the *b*-conductor is prevented. Further dialing by a subscriber will have no effect—as may be noted from the following explanations due to the dialing-conclusion signal.

The pulse receiving relay J1 in the repeater U*e*1, Fig. 2, energizes, in response to the dialing-conclusion pulse. Relay J1 by the closing of its contact *jl* energizes relay H1. Relay H1 short circuits relay M1 over contact 4*h*1 and at the same time disconnects relay K1 at contact 3*h*1. The dialing-conclusion pulse, however, lasts only sufficiently long so that while relay M1 is caused to release, relay K1 continues to hold. As a result, relay G1 is energized over winding I in a circuit from +, 3*v*1, 3*a*1, 3*m*1, 4*k*1, 2*h*1, GI, 4*c*1, —. Relay G1 remains energized over its winding I, but the following holding circuit, independent of relay H1, is produced over its winding II from +, 2*k*1, 6*g*1, G1II, 4*c*1, —. During the energization of relay H1, ground is applied to the *a*-conductor over choke coil D*r*I and contact 7*h*1.

In the time-zone unit ZZ, Fig. 2, relay HZ, as a result, is energized in a circuit from +, D*r*I, 7*h*I, *a*-conductor, *ax*1, Hz, —. Relay Hz connects relay TZ at contact *hz*1; relay TZ holds itself over its own contact *tz*1, and by opening contact *tz*3, opens the pulse repeater circuit to the repeater U*e*1. At the same time by the opening of contact *tz*2, a further connecting of the control voltage to the *b*-conductor is prevented so that series of pulses which might now be transmitted by the calling subscriber can energize relays AZ and VZ, but further transmission thereof is prevented.

The further switching operations in connection with the establishment of connections are without importance for the present invention and description of such operation is therefore omitted.

The release of the connection is brought about by the calling subscriber restoring the receiver. The *c*-conductor to the time-zone device is thereupon interrupted in the first group selector, and relay C*z* deenergizes. This results in release of the seizure relay C1 in the repeater U*e*1. In the latter, the holding circuit of relay K1 is opened by opening contact 6*c*1. Relay K1 restores with a substantial time delay. During the release interval of relay K1, relay A1 is energized for a prolonged interval over its winding III. Relay A1 transmits a correspondingly prolonged A.C. pulse over the trunk line VL to the repeater U*e*2. In repeater U*e*2, relay J2 is energized for a similar prolonged interval. Relay J2 energizes relay A2 for a like interval over contact 8*j*2. Relay C2 is accordingly short circuited for such interval at contact 34*a*2 and releases. Relay C2 opens the *c*-conductor to the second group selector at contact 9*c*2, relay C*g* in such group selector releasing. Relay C*g* opens the *c*-conductor to the connector LW2 at contact 3*cg*, causing release of relays C and G. By the release of relay C, test relay P is caused to restore in known manner, and thereupon the rotary magnet D is connected, which in cooperation with the second winding (not shown) of relay U returns the connector to normal.

Changes may be made within the scope and spirit of the appended claims.

What is claimed is:

1. In an automatic telephone system having a connecting device and serially successively related thereto a plurality of switching devices including a connector for selectively extending a call from a calling subscriber station, under control of impulse series transmitted from such calling station, to a desired called subscriber station which is accessible to said connector, the respective switching devices having line conductors which are responsive to the extension of the call to said connector switched through to extend to corresponding line conductors forming part of said connector; a circuit arrangement for suppressing the effects of impulse series transmitted from the calling station in excess of pulses required for extending the call to the desired called station, said circuit arrangement comprising means in said connector for operatively connecting a predetermined potential to a line conductor thereof which potential is propagated, by way of such line conductor and rearwardly over corresponding line conductors of switching devices preceding said connector, to a predetermined one of said switching devices, means in said connector for altering said potential at an instant prior to completion of the extension of the call to the desired called subscriber station, and switching means in said predetermined one of said preceding switching devices operatively responsive to the alteration of said potential for causing said connecting device to suppress impulse series transmitted from the calling station in excess of the impulse series required for extending the call to the desired called station.

2. A system and cooperation of parts according to claim 1, comprising means in said connector for altering said potential upon conclusion of receipt of the next to the last impulse series.

3. A system and cooperation of parts according to claim 1, comprising circuit means in said connector for normally maintaining a predetermined potential on a line conductor extending rearwardly to said preceding switching devices, first means in said connector for opening a portion of said circuit means to disconnect said potential upon conclusion of receipt of the next to the last impulse series, and means responsive to receipt of the last impulse series for opening another portion of said circuit means to keep said potential disconnected from said line conductor.

4. A system and cooperation of parts according to claim 1, comprising a circuit in said connector for normally maintaining a predetermined potential on a line conductor extending rearwardly to said preceding switching devices, a control relay, means for actuating said control relay upon conclusion of receipt of the next to the last impulse series, means governed by said control relay for temporarily opening a portion of said circuit to disconnect said potential, and means responsive to receipt of the last impulse series for opening another portion of said circuit to keep said potential disconnected from said line conductor.

5. A system and cooperation of parts according to claim 1, comprising a circuit in said connector for normally maintaining a predetermined potential on a line conductor extending rearwardly to said preceding switching devices, a control relay, means for actuating said control relay upon conclusion of receipt of the next to the last impulse series, means governed by said control relay for temporarily opening a portion of said circuit to disconnect said potential, and means for thereafter opening another portion of said circuit to keep said potential disconnected from said line conductor.

6. A system and cooperation of parts according to claim 1, comprising a relay in said predetermined one of said preceding switching devices constituting said switching means, means for connecting said relay to a line conductor incident to the transmission to said connector of the next to the last impulse series to test for said predetermined potential, said relay energizing responsive to said potential.

7. A system and cooperation of parts according to claim 1, comprising a relay in said predetermined one of said preceding switching devices constituting said switching means, means for connecting said relay to a line conductor incident to the transmission to said connector of the next to the last impulse series to test for said predetermined potential, said relay energizing responsive to said potential, and slow-to-release relay means for maintaining the energized condition of said relay.

8. A system and cooperation of parts according to claim 1, comprising a relay in said predetermined one of said preceding switching devices constituting said switching means, means for connecting said relay to a line conductor incident to the transmission to said connector of the next to the last impulse series to test for the presence of said predetermined potential, said relay energizing responsive to said potential at the conclusion of transmission of said next to the last impulse series and slow-to-release relay means for maintaining the energized condition of said relay.

References Cited in the file of this patent

UNITED STATES PATENTS

| | | |
|---|---|---|
| 2,639,330 | Ostline | May 19, 1953 |
| 2,655,559 | Malthaner et al. | Oct. 13, 1953 |
| 2,686,840 | Den Hertog | Aug. 17, 1954 |